US008838438B2

(12) United States Patent
Leary et al.

(10) Patent No.: US 8,838,438 B2
(45) Date of Patent: Sep. 16, 2014

(54) SYSTEM AND METHOD FOR DETERMINING SENTIMENT FROM TEXT CONTENT

(75) Inventors: Adam Leary, San Francisco, CA (US); Philip Pennie, Newton, MA (US)

(73) Assignee: CBS Interactive Inc., San Francisco, CA (US)

( * ) Notice: Subject to any disclaimer, the term of this patent is extended or adjusted under 35 U.S.C. 154(b) by 230 days.

(21) Appl. No.: 13/098,302

(22) Filed: Apr. 29, 2011

(65) Prior Publication Data
US 2012/0278064 A1 Nov. 1, 2012

(51) Int. Cl.
G06F 17/27 (2006.01)

(52) U.S. Cl.
CPC .................................. *G06F 17/274* (2013.01)
USPC ........................................................... 704/9

(58) Field of Classification Search
None
See application file for complete search history.

(56) References Cited

U.S. PATENT DOCUMENTS

| | | | |
|---|---|---|---|
| 7,788,087 B2 * | 8/2010 | Corston-Oliver et al. | 704/9 |
| 7,865,354 B2 * | 1/2011 | Chitrapura et al. | 704/4 |
| 8,010,539 B2 * | 8/2011 | Blair-Goldensohn et al. | 707/750 |
| 8,239,189 B2 * | 8/2012 | Skubacz et al. | 704/9 |
| 8,346,702 B2 * | 1/2013 | Busch et al. | 706/46 |
| 2008/0249764 A1 * | 10/2008 | Huang et al. | 704/9 |
| 2009/0193328 A1 * | 7/2009 | Reis et al. | 715/231 |
| 2009/0248399 A1 | 10/2009 | Au | |
| 2009/0306967 A1 * | 12/2009 | Nicolov et al. | 704/9 |
| 2010/0119053 A1 * | 5/2010 | Goeldi | 379/265.09 |
| 2010/0275128 A1 | 10/2010 | Ward et al. | |
| 2010/0332465 A1 | 12/2010 | Janssens et al. | |
| 2011/0112825 A1 * | 5/2011 | Bellegarda | 704/9 |
| 2011/0161071 A1 * | 6/2011 | Duong-van | 704/9 |
| 2011/0246179 A1 * | 10/2011 | O'Neil | 704/9 |
| 2012/0046938 A1 * | 2/2012 | Godbole et al. | 704/9 |
| 2012/0101805 A1 * | 4/2012 | Barbosa et al. | 704/9 |
| 2012/0101808 A1 * | 4/2012 | Duong-Van | 704/9 |
| 2012/0143597 A1 * | 6/2012 | Mushtaq et al. | 704/9 |
| 2012/0245924 A1 * | 9/2012 | Brun | 704/9 |
| 2012/0253792 A1 * | 10/2012 | Bespalov et al. | 704/9 |
| 2012/0259617 A1 * | 10/2012 | Indukuri et al. | 704/9 |
| 2013/0198204 A1 | 8/2013 | Williams et al. | |

OTHER PUBLICATIONS de Haaff, M., "Sentiment Analysis, Hard But Worth It!", (2010) CustomerThink, www.customerthink.com/blog/sentiment_analysis_hard_but_worth_it.
Turney, P., "Thumbs Up or Thumbs Down? Semantic Orientation Applied to Unsupervised Classification of Reviews". (2002) Proc. ACL, 417-424.
Pang, B., et al., "Thumbs up? Sentiment Classification using Machine Learning Techniques", (2002) Proc. EMNLP, 79-86.
Pang, B., et al., Seeing Stars: Exploiting Class Relationships for Sentiment Categorization with Respect to Rating Scales, (2005) Proc. ACL, 115-124.
Thelwall, M., et al., "Sentiment Strength Detection in Short Informal Text", (2010) J. Amer. Soc. Info. Science and Tech., 2544-2558.

(Continued)

*Primary Examiner* — Brian Albertalli
(74) *Attorney, Agent, or Firm* — Mahamedi Paradice LLP

(57) ABSTRACT

A system and method for determining sentiment from user-generated text content is provided. A sentiment score is determined for one or more terms in a user-generated text content. A sentiment value is determined for the text content that is based at least in part on the sentiment score for the one or more terms.

23 Claims, 7 Drawing Sheets

(56) References Cited

OTHER PUBLICATIONS

Pang, B., et al., (2008) Opinion Mining and Sentiment Analysis, Now Publishers.
Mihalcea, R., et al., "Learning Multilingual Subjective Language via Cross-Lingual Projections", (2007) Proc. ACL, 976-983.
Pang, B., et al., "A Sentimental Education: Sentimental Analysis Using Subjectivity Summarization Based on Minimum Cuts", (2004) Proc ACL, 271-278.
Hu, M., et al., "Mining and Summarizing Customer Reviews", (2004) Proc. KDD.
Liu, B., et al., "Opinion Observer: Analyzing and Comparing Opinions on the Web", (2005) Proceedings of WWW.
Liu, B., "Sentiment Analysis and Subjectivity", (2010) Handbook of Natural Language Processing, 2nd ed., ed. Indukhya, N. and Damerau, F.
Kim, S., et al., "Automatic Identification of Pro and Con Reasons in Online Reviews", (2006) Proc. COLING/ACL, 483-490.
Wright, A., "Mining the Web for Feelings, Not Facts", (2009) New York Times, Aug. 23.
Cordis, "Collective emotions in cyberspace (Cyberemotions)", (2009) European Commission, Feb. 3.
Condliffe, J., "Flaming drives online social networks", (2010) NewScientist, Dec. 7.
Office Action mailed Aug. 7, 2014, for related U.S. Appl. No. 13/433,168, filed Mar. 28, 2012, 17 pages.

* cited by examiner

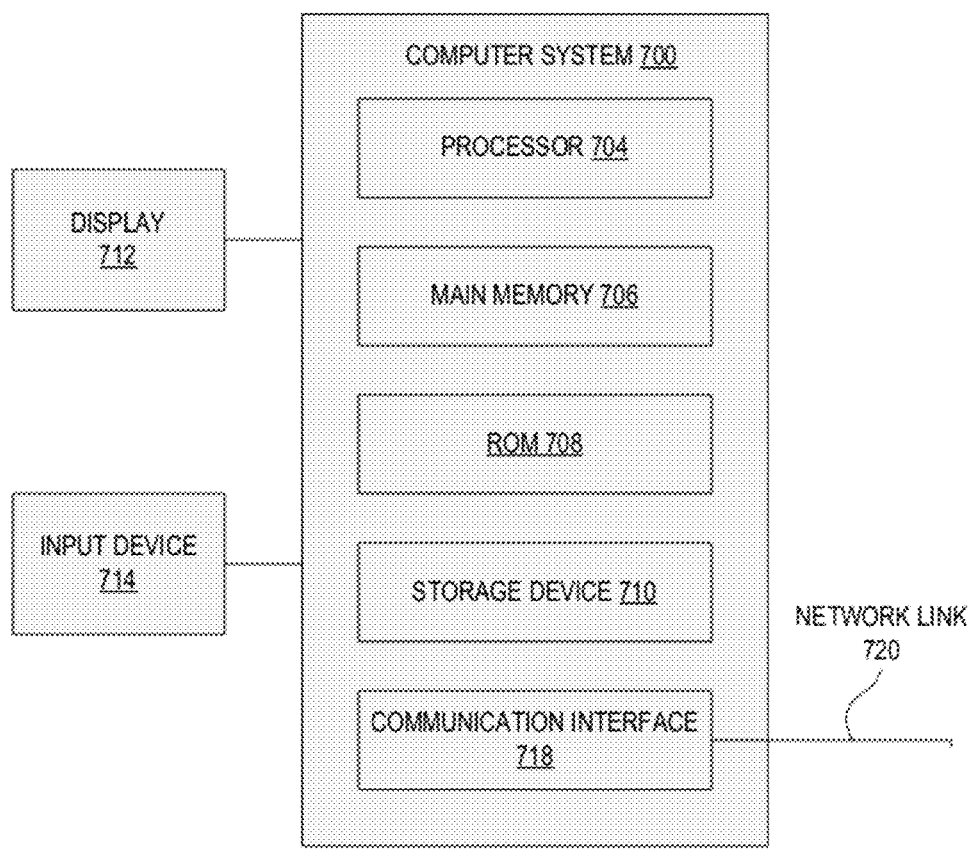

SYSTEM AND METHOD FOR DETERMINING SENTIMENT FROM TEXT CONTENT

TECHNICAL FIELD

Embodiments described herein pertain to content analysis, and more particularly, to a system and method for determining sentiment from analysis of content.

BACKGROUND

Online mediums currently provide various forums by which individuals can provide feedback, commentary and social marking. For example, various websites employed like/follow functionality to enable users to mark an online item they like or are interested in. Commentary forums (e.g. message boards) also exist to enable users to express feedback, usually in the context of some other content, such as a review or news item. Additionally, functionality exists to enable users to share content or information that is of interest to them.

BRIEF DESCRIPTION OF THE DRAWINGS

FIG. 7 is a block diagram that illustrates a computer system upon which embodiments described herein may be implemented.

DETAILED DESCRIPTION

Figure 1:
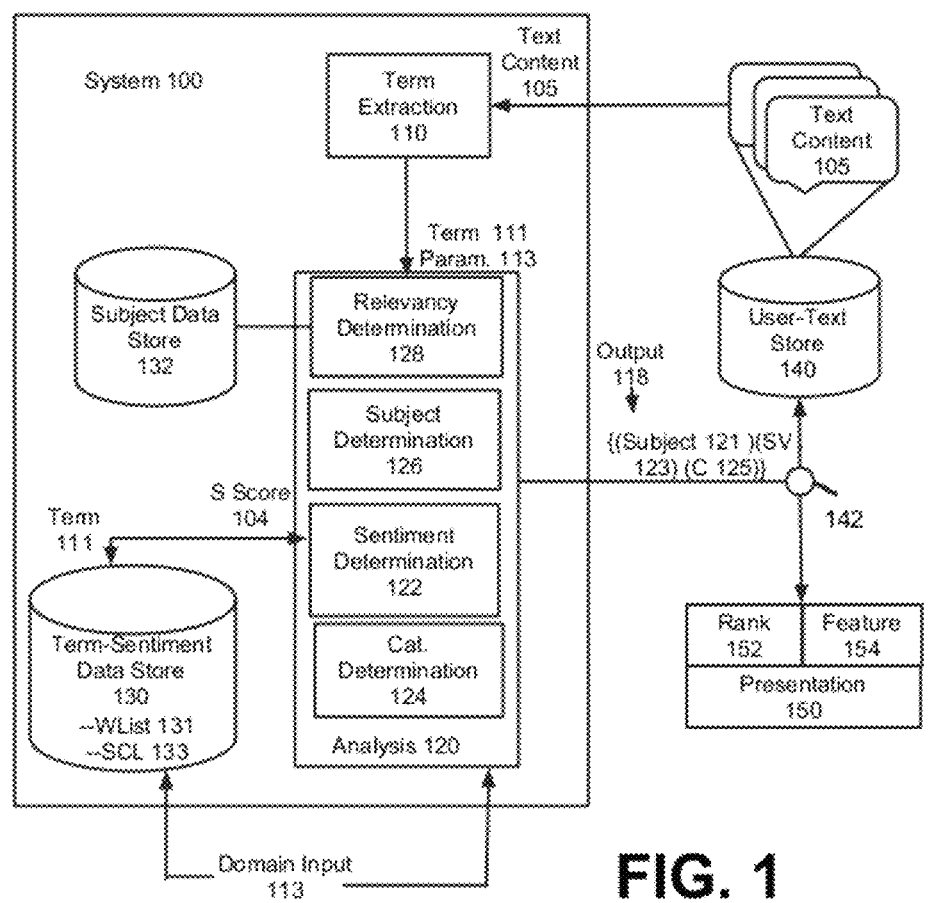
FIG. 1 illustrates a system architecture for performing sentiment analysis on text content, according to one or more embodiments.

Embodiments described herein include a system and method for determining sentiment expressed in user-generated text content.

In particular, embodiments described herein recognize the increased presence of user-generated text content on websites and online mediums, such as social networking sites and user-review sites. In contrast to some conventional online techniques which enable the user to express like/dislike by rating, voting or liking/following a particular item, embodiments described herein measure sentiment by analyzing the terms (e.g. words or word pairs), clauses and sentences that are present in the text content. Thus, embodiments provide that the user sentiment is deciphered from words, expressions and clauses the user employs to convey their thoughts.

Sentiment analysis, as described by numerous embodiments herein, may be implemented in a variety of contexts. Embodiments such as described herein may implement sentiment analysis to gauge user sentiment in the context of, for example, reviews and/or discussions of restaurants, wines, food (e.g. recipes, fine foods for sale), forum discussions on cooking and the like. Sentiment analysis may also be performed for user reviews and discussion on various other topics, such as books, movies, television (or radio programs), websites or online content, politics, product reviews. Still further, some embodiments may implement sentiment analysis to gauge user sentiment in relation to messages (e.g. email) or commentary composed by a user, or by a population of users. Embodiments described may be implemented to determine sentiment and content for publicly available user-generated content. Alternatively, the sentiment determination may be made available only to those viewers who are privy to view content generated from a particular user.

Under one embodiment, user-generated text content is analyzed to determine a sentiment value that a user expresses for a subject (e.g. topic, place or thing). The sentiment value may be multi-dimensional, in that it may reflect sentiment for different characteristics or aspects of the subject. The sentiment value may be based at least in part on sentiment scores associated with individual words that the user used.

Still further, to one or more embodiments, one or more subject terms, domain category terms and sentiment terms are identified from a user-generated text content. A determination is made as how each of the one or more sentiment terms is relevant to the one or more subject terms and/or the domain category terms. A sentiment score is determined for each of the sentiment terms. A sentiment value is determined for a subject identified by the subject term. The sentiment value of the subject may be based on one or more sentiment scores for sentiment terms that are determined to be relevant to the one or more subject terms and/or the one or more domain category terms Among other advantages, embodiments described herein can also measure an intensity of the user's sentiment (e.g. how much the user's likes something). For example, the degree of enthusiasm or disgust a particular user has for a particular subject can be measured from sentiment analysis, as described herein.

According to some embodiments, user-generated text content is analyzed in order to determine a sentiment that the author expresses as to a particular subject of the content. The sentiment may be programmatically determined and quantified to represent a particular sentiment such as like/dislike, as well intensity of the sentiment.

As described with some examples, the context of the user-generated text content may correspond to reviews of business establishments and products. The sentiment that is deciphered from the terms and expressions used by the author may be applied to understand the sentiment the user has for the establishment or product.

With content such as user-reviews, embodiments further recognize that the user's sentiment may vary for different aspects of the user's experience. For example, with products or service, the user's sentiment may vary as to the product/service, price and overall experience.

According to some embodiments, the sentiment can be determined from words, terms and expressions the user employed. Furthermore, the relevance or applicability of the words to a subject or its characteristic can be determined from grammatical analysis of the text content.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Architecture

FIG. 1 illustrates a system architecture for performing sentiment analysis on text content, according to one or more embodiments. A sentiment determination system 100 is comprised of components that include term extraction 110 to identify salient terms from user generated text content 105, and analysis component 120 to determine a sentiment value for the user generated text content 105 based in part on the presence of terms in the content.

According to some embodiments, the system 100 can be implemented by a server, or a combination of servers. However, other non-server computing environments can alternatively be used. For example, the system 100 may be implemented on a single user terminal, or in a networked environment of shared resources were individual computers communicate by way of, for example, client/server or peer to peer connections. FIG. 7 illustrates a computer system for implementing embodiments such as described with FIG. 1.

In some implementations, system 100 may be implemented as a service. In particular, system 100 may include a programmatic interface to respond to function call requests from other applications or sites that specify text content 105. The system 100 includes programmatic components for performing functions that operate on the text, including functions for tokenizing the text content, analyzing the grammatical structure of the text, and identifying sentiment and subject from the text.

According to an embodiment, term extraction 110 processes user generated text content 105 from a particular resource or location. In the example shown, a user generated text content store 140 retains text content 105 that is analyzed by the system 100. The text content store 140 may maintain user generated text content 105 in the form of, for example, user reviews of business establishments and products, social networking content, commentary, and/or blog entries. Alternatively, the text content 105 may be generated or retrieved on the fly by a retrieval or submission process. Term extraction 110 tokenizes the content 105 into individual terms. The term extraction 110 may identify, from a given text content 105, a set of terms 111, as well as parameters 113 for utilizing the terms 111 for sentiment analysis. The terms 111 may correspond to probative terms that can be used to identify sentiment or subject from the text content. The parameters 113 may include contextual data or metadata for use in making subject/sentiment determinations.

The analysis component 120 performs functions for identifying sentiment and subject (or entity) from the text content 105. The analysis component 120 may also include a component for determining sentiment category, as detailed below. In one embodiment, the analysis component 120 comprises sub-components that include term sentiment determination 122, sentiment category determination 124, subject determination 126 and relevancy analysis 128. The term sentiment determination 122 identifies a predetermined sentiment score 104 assigned to individually extracted terms 111 of the text content 105. According to some embodiments, individual terms that are deemed to carry sentiment may be predefined and associated with a corresponding sentiment score. In one embodiment, the sentiment score 104 is singular in dimension and correlates to an intensity or degree of a particular sentiment, such as happiness/unhappiness of the user (e.g. the amount the user likes something). In other embodiments, the sentiment score 104 of a particular term is multi-dimensional, and may correspond to a continuum of affects or emotion, such as fear, anger, and like/dislike. For example, as shown with an embodiment of FIG. 5, multiple types of sentiment may be identified and scored from a single text content. Still further, in some variations, the sentiment score 104 may be limited in range, such as provided by the following examples: (i) positive or negative; or (ii) positive, negative, or neutral. Still further, the sentiment score 104 may correspond to a number that is between a range, or a discrete set of numbers between such range (e.g. rating of 1 to 5).

The sentiment score 104 for individually extracted terms 111 of a given item of text content 105 may be stored in a term sentiment data store 130. In some embodiments, the term-sentiment data store 130 maintains (i) a word list 131, and (ii) a list of predetermined sentiment scores 133 for individual entries of the word list 131. The contents of the data store (e.g. word list 131) may be domain specific. Thus, multiple word lists 131 and associated sentiment scores can be maintained for different domains of subjects. The terms 111 extracted from the text content 105 can be compared against the word list 131 to identify a corresponding sentiment score 104 as provided by the sentiment score list 133. The word list 131 and sentiment score list 133 can be built or developed from a variety of sources, such as manual input.

As an alternative or addition, some or all of the entries of the word list 131 and/or sentiment score list 133 may be programmatically determined. For example, text content from a particular set of sources may be scraped for terms and expressions. Additionally, the terms and expressions may be associated with a sentiment by analyzing or identifying a ranking or rating associated with the content. In one implementation, initialization files are created for a particular domain. The preliminary initialization files may be created by clustering a sample of the text based on key concepts that are identified (e.g. manually) identified as being part of the ontology of attitude or entities. Once established, editors or additional programmatic input may be used to tune the word lists and associated values.

In utilizing predetermined scores for entries of the word list, embodiments recognize that various influences may affect the accuracy of understanding the sentiment. For example, a term in one context may have a positive sentiment, while in another context, it may have a negative sentiment. For example, the term "rich" may have a slightly negative connotation when used to describe food, and a more positive connotation when referring to a literary work.

Furthermore, some embodiments recognize that many factors can affect the sentiment carried by a particular term. In particular, the domain of the user generated text content 105 can greatly influence both (i) the contents of the word list, and (ii) the sentiment associated with individual terms of the word list. Accordingly, the term-sentiment data store 130 may include domain specific parameters 113, which can identify the word-list 131 (from among multiple possibilities), or alternatively entries of word-lists 131 for the particular domain. The domain specific parameters 113 can identify the context of the text content 105 which is analyzed. For example, domain specific parameters may be defined from a website from which text content is scraped. Such text content may correspond to reviews of restaurants, foods, or wines is provided, and the domain specific parameters may include (i) words used in restaurant/food reviews (e.g. website jargon), and (ii) sentiment derived from word definitions and uses that are specific to restaurant/food reviews.

Additionally, the semantic context of a particular word or term is relevant. In one embodiment, pairings are used to identify whether a sentiment is inferred from a particular term. Analyzing Word pairing can offer a more accurate sentiment analysis than the individual words.

Embodiments also recognize that the semantic context determined for a particular content 105 is typically pertinent to a particular subject, such as a business establishment, service and/or product. In some embodiments, the term extraction 110 extracts terms 111 that are potential subjects of the user content and sentiment. For example, the subject of the user content 105 may correspond to, for example, a business establishment or commercial product. In this example, the analysis component 120 may include a subject determination component 126 that determines the subject (e.g. restaurant, food product or service, etc.) from the extracted terms 111. In some embodiments, the subject determination 126 can incorporate a subject data store 132, which may include a list of potential subjects for a given domain. For example, on a food website, the subject list may include names of restaurants or food establishments, or alternatively, of food products (e.g. wines).

Additionally, in some embodiments, the analysis component 120 includes a sentiment category determination 124 that identifies a category for the user sentiment as it applies to the subject. The category determination 124 may identify, for example, facets of the user experience which can have a different user sentiment. For example, in a user restaurant review, the user may have different sentiments about the food, the service, the price, the ambiance, and the overall experience. The category determination 124 may identify terms that indicate the content is pertinent to a domain category (e.g. restaurant pricing).

In some embodiments, relevancy analysis 128 is used to identify, with some precision, the relevance of terms of sentiment (as determined by sentiment determination 122) to subject (as determined by subject determination 126) or categories (as determined by category determination 124). Relevancy analysis may use various metrics and/or algorithms (such as described with steps of FIG. 3) to determine the relevancy of particular terms of sentiment to subject or subject category. For example, if the user expresses a term of positive sentiment, the relevancy analysis 128 may be used to determine whether the sentiment was for a particular domain category (e.g. the user liked the price). Relevancy analysis 128 may use, for example, word pairing (as described below), proximity of sentiment term to subject term or category term, rules and grammatical analysis (e.g. clausal analysis, as described below).

The analysis component 120 generates an output 118 comprising one or more sentiment values 123 for a given item of user text content 105. The output 118 may also identify the subject 121 of the user text content 105, as well as one or more subject or domain specific categories 125 that can be the focus of user sentiment. The terms of sentiment may be associated with subject terms or domain category terms.

The output 118 of the analysis component 120 can be stored in, for example, data store 140. In one embodiment, the output 118 is an interactive display of the text content 105, with tagged results corresponding to sentiment and/or subject (e.g. an html format). In some implementations, the output 118 may be generated from a batch process in which multiple text content 105 is analyzed. The results may be communicated to other sites, presented and/or stored in databases for subsequent use and/or presentation.

The determined sentiment value(s) 123 may be stored in association with the user text content 105 and represent what is determined to be sentiment for the subject. After analysis, the given user text content 105 may be associated with sentiment value 123 that correlates to (i) the users sentiment for a particular facet or category of the subject in the user content (e.g. business establishment), and/or (ii) the users sentiment in general, on average, or overall when all facets and categories are considered. The sentiment value(s) 123 that is determined for the particular item of user text content 105 may be based on the sentiment score 104 for salient terms 111 that are relevant to the subject and or the subject categories. For example, the sentiment score 104 for individual terms that are extracted from the text content may be averaged (or categorized and then averaged), in order to determine sentiment for the subject and/or a particular predefined domain-relevant category. Thus, for a given item of user content 105, the sentiment value 123 may be based on the sentiment score 104 of multiple salient terms 111 that appear in the content. Various algorithmic considerations may be employed in determining the sentiment value 123. The sentiment value 123 may correspond to a number range. Alternatively, the sentiment value 123 may correspond to a discrete set of numbers (e.g. 1 to 5). As another variation, the sentiment value may correspond to a finite or limited value, such as positive/negative, or positive/neutral/negative.

In some implementations, domain specific parameters 113 may also influence the determination of the output 118, including the determination of the sentiment values 123, as well as determination of the subject category determination. The manner in which the sentiment values are calculated based on the sentiment scores 104 of individual salient terms may also be affected by domain specific parameters and considerations. For example, in the context of business establishment reviews, domain specific parameters 113 may provide that the sentiment score 104 of salient terms 111 that appear at the beginning portion of the text content are to weigh more than the sentiment scores of terms that appear at the end of the item of content.

In some implementations, an interface 142 enables access by other components to the output for individual items of text content. In one embodiment, a presentation component 150 accesses the output 118 in order to generate representative content or presentation features that are based on a particular user sentiment. In some implementations, a presentation feature 154 generates a display feature (e.g. icon) from a determined sentiment. The display feature can be associated with the text content 105 that was analyzed. For example, the presentation feature 154 may generate emoticons (animated faces or expressions of emotion) automatically based on the terms and programmatically perceived context of a given item of text content (e.g. message, commentary posted on a website, consumer review or feedback, social networking feed etc.). As an alternative to emoticons or other qualitative expressions of sentiment, some embodiments include displaying sentiment features that are quantitative, such as sentiment scores (e.g. see FIG. 6).

Alternatively, the subject of the analysis may be associated with the feature. For example, consumer reviews of restaurants (or other business establishments) or food items (e.g. wines) may be evaluated for sentiment. The reviews may by parsed at the individual user or author record level, to temporarily opinion level sentiment prior to aggregation. The sentiments may be quantified and tallied in a manner that reflects an overall sentiment of customers for that restaurant. A feature that represents an overall (or average) sentiment of an online population that has provided a review for the particular subject may be presented adjacent to information or advertisement for that subject (e.g. restaurant or food item). For example, restaurants that receive rave user reviews and enthusiastic support from visitors may have information presented with an iconic expression that reflects the enthusiastic customer sentiments. Likewise, restaurants that received mediocre reviews may be presented with information that reflects the mediocre sentiments. Alternative variations include presenting scores of one or more kinds of sentiments based on aggregated totals from various items of content (e.g. aggregation and average of multiple user reviews).

As an alternative or addition to feature presentation, some embodiments may rank subjects of user content by sentiment. For example restaurants can be ranked by categories and sentiment, with restaurants that have the most enthusiastic support being ranked higher than those that have more mediocre sentiment. The rankings may be presented to users in a variety of ways, such as a top list (e.g. top-ten list) of restaurants that people love in a given geographic region. Examples of subjects that can be ranked include business establishments and products. Furthermore the rankings may be specific to specific facets or categories of the business establishments and/or products. For example, restaurants may be ranked by ambience, quality of food, or service. To rank based on sentiment, the sentiment values 123 for the subjects 121 (and/or it subcategories 125) can be tallied and averaged, or otherwise processed in order to determine rankings.

As mentioned, system 100 may be implemented as a programmatic service that provides output 118 to other sites or components. As such, the presentation component 150 may be part of another system, or under control of another entity altogether. System 100 may include a programmatic interface to receive, for example, function calls from another site or programmatic component. The call can specify an input text to be analyzed, an output format, and a subject domain (if one exists, else one may be made). Text content identified from the requesting site/component may then be analyzed as described. The tagged text along with other metrics may comprise the output 118.

Methodology

Figure 2:
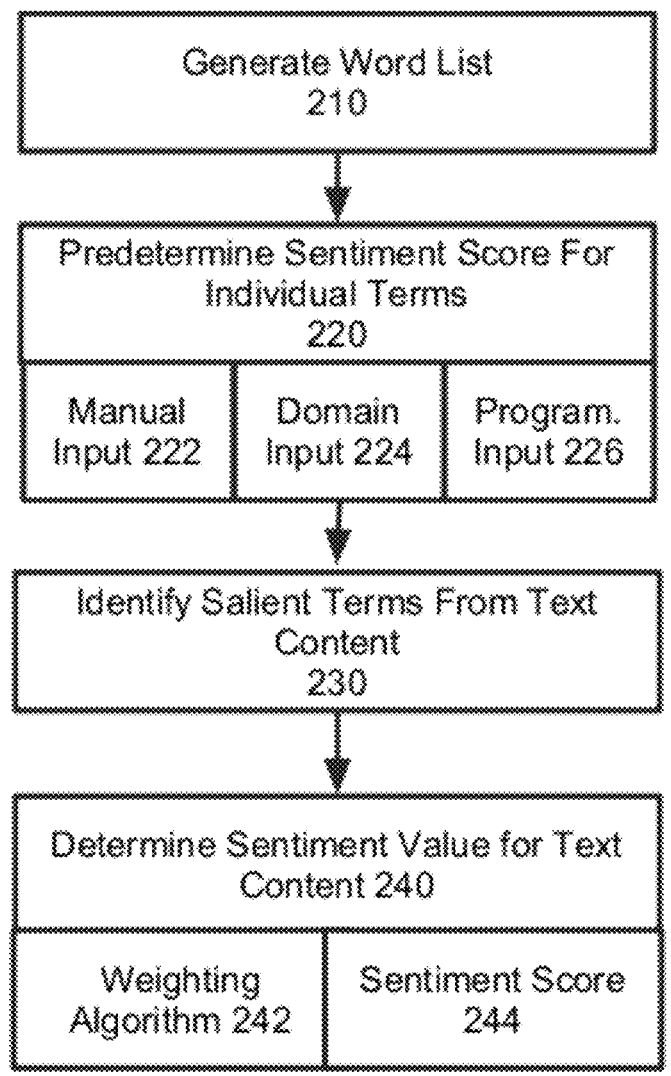
FIG. 2 illustrates a method for determining sentiment from user generated text content, according to one or more embodiments.
Figure 3:
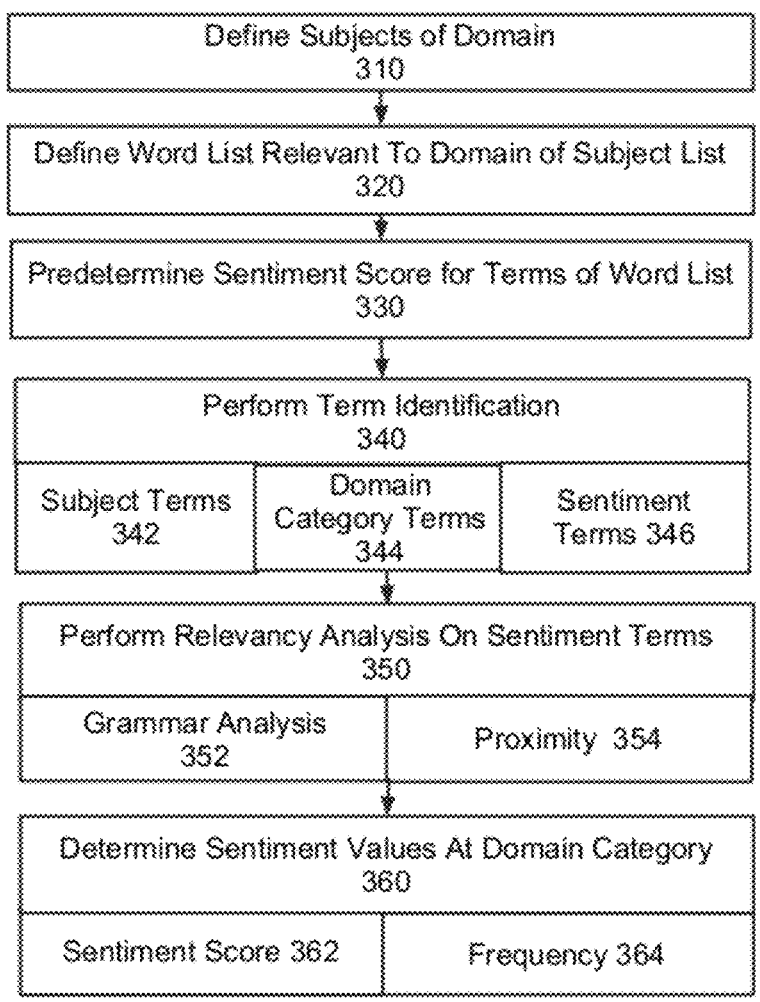
FIG. 3 illustrates a method for determining sentiment value of text content generated pertaining to particular subjects.

FIG. 2 and FIG. 3 each illustrate a method for determining sentiment from user generated text content, according to one or more embodiments. A method such as described by FIG. 2 or FIG. 3 may be implemented using a system such as described with an embodiment of FIG. 1. Accordingly, reference may be made to elements of prior embodiments for purpose of describing a suitable element or component for implementing a step or sub-step being described.

A word list comprising salient terms may be generated for particular contexts or subject (210). A sentiment score may be determined for individual entries of the word list (220). The sentiment score of individual terms can be determined or affected from manual input (222), domain input (224) and/or programmatic input (226). Manual input 222 may also coincide with using surveys or crowd sourcing in order to gauge or understand the sentiment behind a word. For example, trendy terms may best be understood by analyzing or receiving input from a given population of users as to the emotional meaning behind the term.

The domain input (224) may influence or structure various aspects for determining sentiment scores of individual terms or expressions. The word list from which predetermined sentiment scores are determined may include terms or words that are domain-relevant. For example, wine reviews (domain: wine tasting) may include terms such as "bold" and "legs" which are not as relevant to, for example, the domain for restaurant reviews. Additionally, the domain input (224) may affect the sentiment score of a particular word by considering the meaning of a word or term in the context of the domain (food reviews). A word or expression that can have multiple meanings (e.g. "rich") may be designated to have the meaning (and associated sentiment score) that is most relevant to the domain. Domain input (224) may also recognize, for example, that in some context, some words carry more enthusiasms, or a sentiment that is contrary to the term's popular use.

Programmatic input 226 can also be used to identify entries for word lists or sentiment scores. In an embodiment, a programmatic process can be implemented to scrape text from various sources, such as social network sites and user reviews, in order to understand the affect reflected in the term. For example, many sources exist online where users can provide a "thumbs up" or rating for a particular subject. Some terms that are used in providing positive and negative feedback may be aggregated and associated with a sentiment that is reflected by the quantified feedback in the various online environments.

Still further, in some embodiments, a combination of programmatic and manual input may be used to identify word entries and respective sentiment scores. In one implementation, an interactive tool may be employed to score and modify a word list for a particular domain. Manual input may score terms of the word list, based on understanding of sentiment carried by the individual term (which may require additional input/analysis from sources such as dictionaries and social network sites).

According to some embodiments, the word list and associated sentiment scores are stored in a data structure for use when analysis of the text content is performed. Analysis of the text content can identify salient terms (230), which include those terms that are candidates for conveying user sentiment. The salient terms may also include a subject of the text content (e.g. business establishment). Category expressions may also be employed to determine terms that are specific to a category of the subject (e.g. price, ambiance).

One or more sentiment values 240 are determined for the analyzed text content. The sentiment value determination may be algorithmic, and take into consideration factors such as frequency of positive and negative terms occurring near the subject of the text content. In some implementations, the individual sentiment scores of the terms (if available) may also be aggregated, and optionally weighted to account for proximity to the subject. An overall sentiment value 240 may reflect the user-sentiment for a particular subject, such as for a particular restaurant or wine. In some embodiments, other sentiment values may reflect the user sentiment for aspects of the subject, such as pricing or taste. In determining the sentiment values, the sentiment score 244 for select salient terms may be determined. Algorithmic input, such as weighting or other calculations, may also be employed to calculate a sentiment value reflecting user sentiment for the subject or category of the content, based on the sentiment score of individual terms.

With FIG. 3, a method is described for determining sentiment values of text content generated pertaining to particular subjects. The subjects of the domain can be predetermined (310). For example, in one implementation, the subjects of the domain correspond to restaurants in a particular geographic region. The subjects of the domain may correspond to the proper names of the restaurants. Similarly, for wines, the subjects of the domain correspond to the names of wines.

The word list for the domain of the subjects may be predetermined (320). The word list may correspond to terms and expressions that are typically used to convey sentiment in the particular topic or general category of the subjects. For example, for restaurant reviews (domain), the word list may comprise of expressions typically used to convey sense of taste, smell, well-being, happiness etc. The sentiment score for individual words or terms may be predetermined (330).

As mentioned with other embodiments, the word list and/or sentiment score can be determined from manual input, or alternatively, from programmatic input (e.g. scraping and analysis of text from reviews along similar domains, from social network sites etc.). The word list and/or sentiment scores may also be determined from surveys and crowd-sourcing.

The text content is processed to determine what the user is expressing sentiment for at various instances in the content. In particular, the user's sentiment may be related to (i) a subject of the content as a whole (e.g. business establishment), (ii) the subject category, such as specific characteristics or aspects of the subject as it pertains to the domain (e.g. pricing of food items for Joe's Bistro in domain of restaurant), or (iii) sentiment that is off-topic or not specific to the subject of the user's content (e.g. "anyone notice much beef costs nowadays?!").

Accordingly, in determining user sentiments, one or more embodiments perform term identification (340). The terms that are identified can relate to the subject of the text content (342), categories of the subject/domain (344), terms of sentiment (words or expressions that are associated with a particular sentiment) (346).

In connection with term analysis, one or more embodiments utilize relevance analysis in order to identify the relevance of terms of sentiment to terms of subject or domain categories (350). Relevance analysis can be identified independently or integrally with term identification. Relevance analysis identifies what subject or subject category (if any) a sentiment expression is expressed for.

In order to determine relevance of the sentiment terms to subject or subject category, one or more embodiments implement grammatic analysis and/or rules (352). In particular, an embodiment utilizes clausal analysis to identify sentences and clauses in the user's text content. The identification of sentences/clauses provides a mechanism to determine what expressions of user sentiment relate to. For example, in the user review for a restaurant, the user's expression of "fantastic" could refer to the overall experience, the food or the price. Sentence and clausal structures can be identified form the text to determine whether the expression is most relevant to the subject or the subject category.

According to some embodiments, sentences/clauses can be identified as modal with presence of words that are conditional (e.g. "if", "would", "might have been"). Such clauses typically reflect sentiment to a noun of the clause. Other clauses that can be identified from content include dependent clauses, which include specific expressions that signify the presence of a dependent clause. The presence of sentiment terms in such clauses also can carry direct relevance to the noun expressed in the clause.

In addition to clausal analysis, certain rules may be implemented to determine the relevance or significance of certain terms. For example, a grammatical rule may correspond to one word sentences that use terms of strong sentiment, such as "Fantastic!". The presence of such sentences may be predetermined by rule for specific treatment as to relevance and context.

In addition to grammatical analysis, proximity of a sentiment term to the subject (or its category) may also reflect the user's sentiment for the subject or category (354).

A subject-sentiment scoring algorithm is implemented to determine one or more sentiment values that characterize the user sentiment for the subject, or relevant domain specific categories pertaining to the subject. Specifically, various sentiment values are determined at the level of the domain category, by article and/or by author (360). As mentioned with other embodiments, the sentiment value may reflect the user's overall sentiment, or the user's sentiment for a particular aspect of the subject. The sentiment valuation algorithm may utilize various parameters and metrics in determining the sentiment value for the subject or subject's domain category. Individual terms of sentiment may, for the given domain, be associated with a sentiment score that can reflect like/dislike and/or other sentiments (362). The valuation algorithm may, for example, use summation, weights or other formulations in order to determine the score of the user's sentiment for the subject or the domain category of the subject.

In addition to scoring, the sentiment valuation may also include use of term frequency (364), which identify whether a particular term has been used once, twice or more in the content.

Another parameter for determining sentiment includes word pairing (366). In particular, the sentiment carried by some terms may better be understood and quantified using word pairing. Word pairings correspond to two or more words that appear together, in the same sentence or sufficiently proximate to one another to assume they can be paired. Requirements may be stored as for spacing terms, depending on the particular word and/or domain. As an example, in the context of restaurant reviews, the following word pairs are examples of terms that can be assumed to convey sentiment as a result of the pairing: bad: experience; great: meal; absolutely: fantastic; ultra: fresh; best: dinners; final: bill; little: expensive; memorable: delicious. The pairings may convey sentiment about the experience as a whole (e.g. bad: experience), or about a particular category of the subject (e.g. great: meal or little: expensive). The word pairings may carry a sentiment value for a particular sentiment. Alternatively, individual words in the pairing may carry the sentiment value, or carry different sentiment value if the word pairing is present. Still further, the word pairing may verify sentiment value for a particular sentiment, rather than separately scored a sentiment. In variations, word pairing can also be used to determine relevancy of a term of sentiment.

In implementations where the sentiment is singular in dimension, the sentiment value may reflect the score for that particular sentiment (e.g. happiness). In other implementations where the sentiment can be of different types, the word pairings may carry a sentiment value that is associated with a particular type of sentiment (e.g. disgust, sad, angry, fear and happy).

The sentiment score for the individual terms can be averaged, weighted or otherwise tallied in determining the sentiment value associated with the subject (or subject category) (368).

Expressions of Sentiment Value and Presentation

Figure 4:
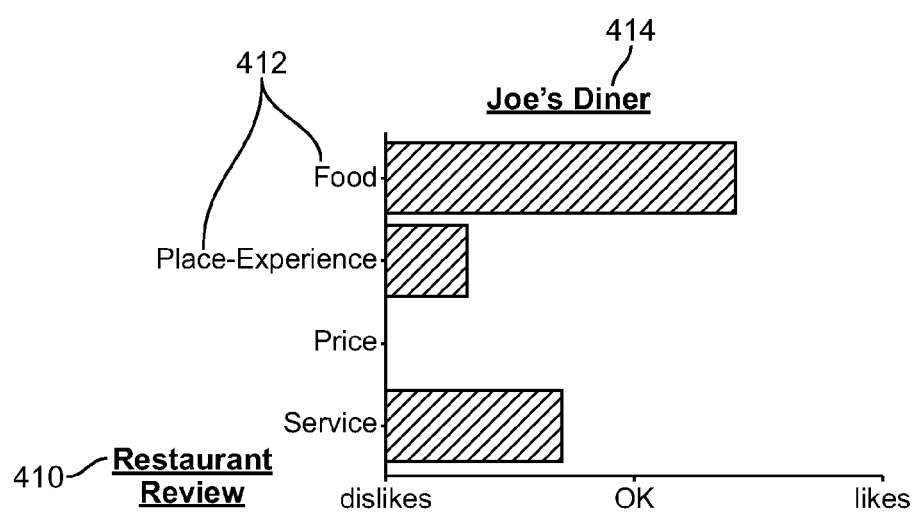
FIG. 4 illustrates a sentiment determination for predetermined categories that are relevant to a domain and subject, according to one or more embodiments.

FIG. 4 illustrates a sentiment determination for predetermined categories that are relevant to a domain and subject, according to one or more embodiments. In the example provided, the domain 410 may correspond to one in which restaurants are reviewed and discussed in an online forum. The predetermined categories 412 for the domain can include, for example, food, place experience, price, and service. For a given subject 414 (e.g. Joe's Diner), sentiment from one or more user reviews or commentaries may be used to determine category-specific sentiments. In one implementation, graphical representations may be used to display the identified sentiment for the particular category. Moreover, in the implementation provided, the sentiment is described between a range of affects that includes dislike (negative), OK (neutral), and likes (positive). In such an implementation, the sentiment may be considered to be of a one-dimensional value that correlates to happiness (or like/dislike in). The sentiment determination for different subcategories may be represented for single user, or for multiple users. In the latter case, sentiment values for the particular subject 414 (Joe's diner) may be aggregated and tallied by, for example, using an averaging process.

Figure 5:
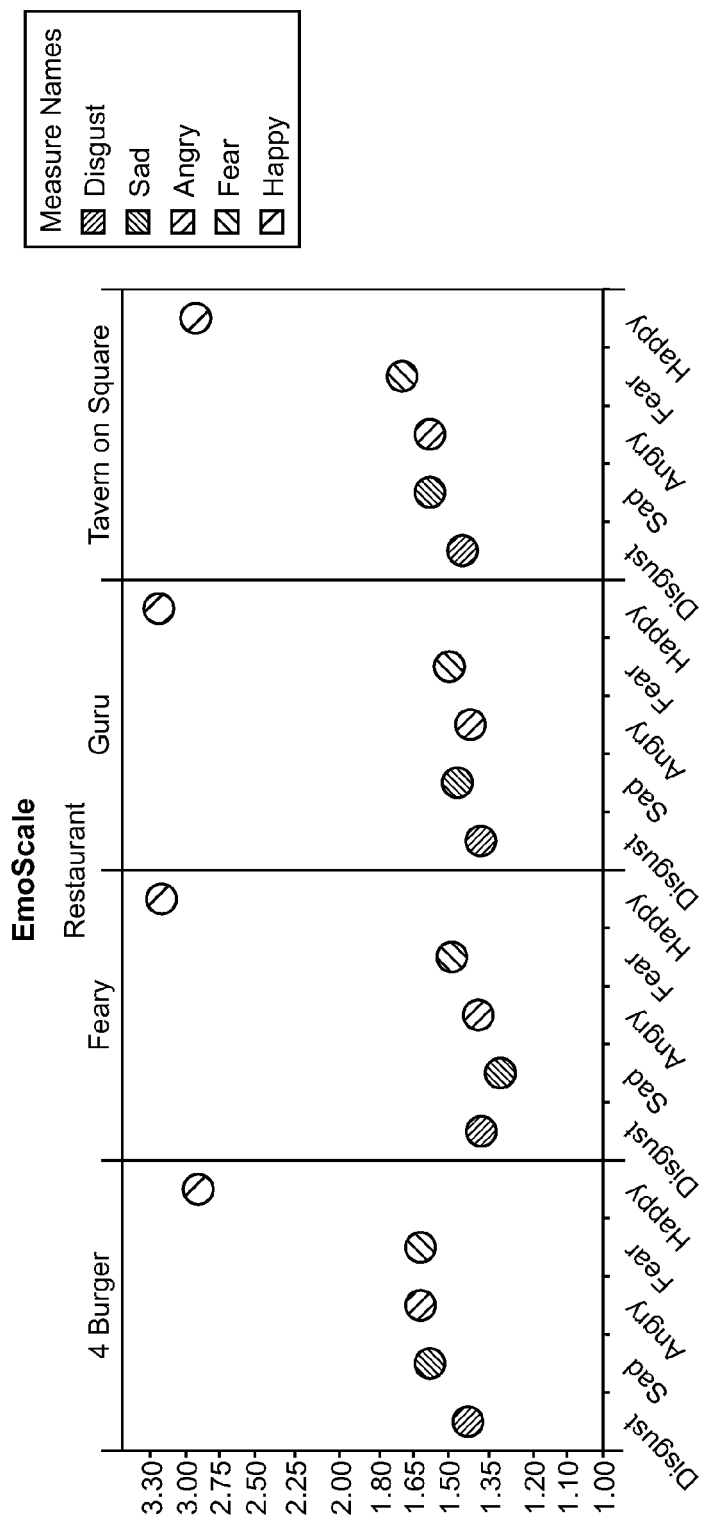
FIG. 5 illustrates a sentiment determination for subjects of a given domain, according to another embodiment.

FIG. 5 illustrates a sentiment determination for subjects of a given domain, where the sentiment determination is multi-dimensional to include values for different sentiments, according to another embodiment. As with the example of FIG. 4, the domain may correspond to one in which restaurants are reviewed and discussed in an online forum. In the example shown, the different sentiments correspond to disgust, sadness, angry, fear, and happiness. Other sentiments may be used or substituted for those shown. Based on the sentiment analysis performed on the user-text content, different values may be associated with each of the different types of sentiments. In one embodiment, each type of sentiment value associated with the text content may be based on a sentiment value determined from terms used in the text (when such terms are considered with other algorithmic considerations, such as proximity to subject and/or word pairings). Thus, for example, one article may contain multiple sentiment values, based on sentiment scores of individual terms for different types of sentiments.

Figure 6:
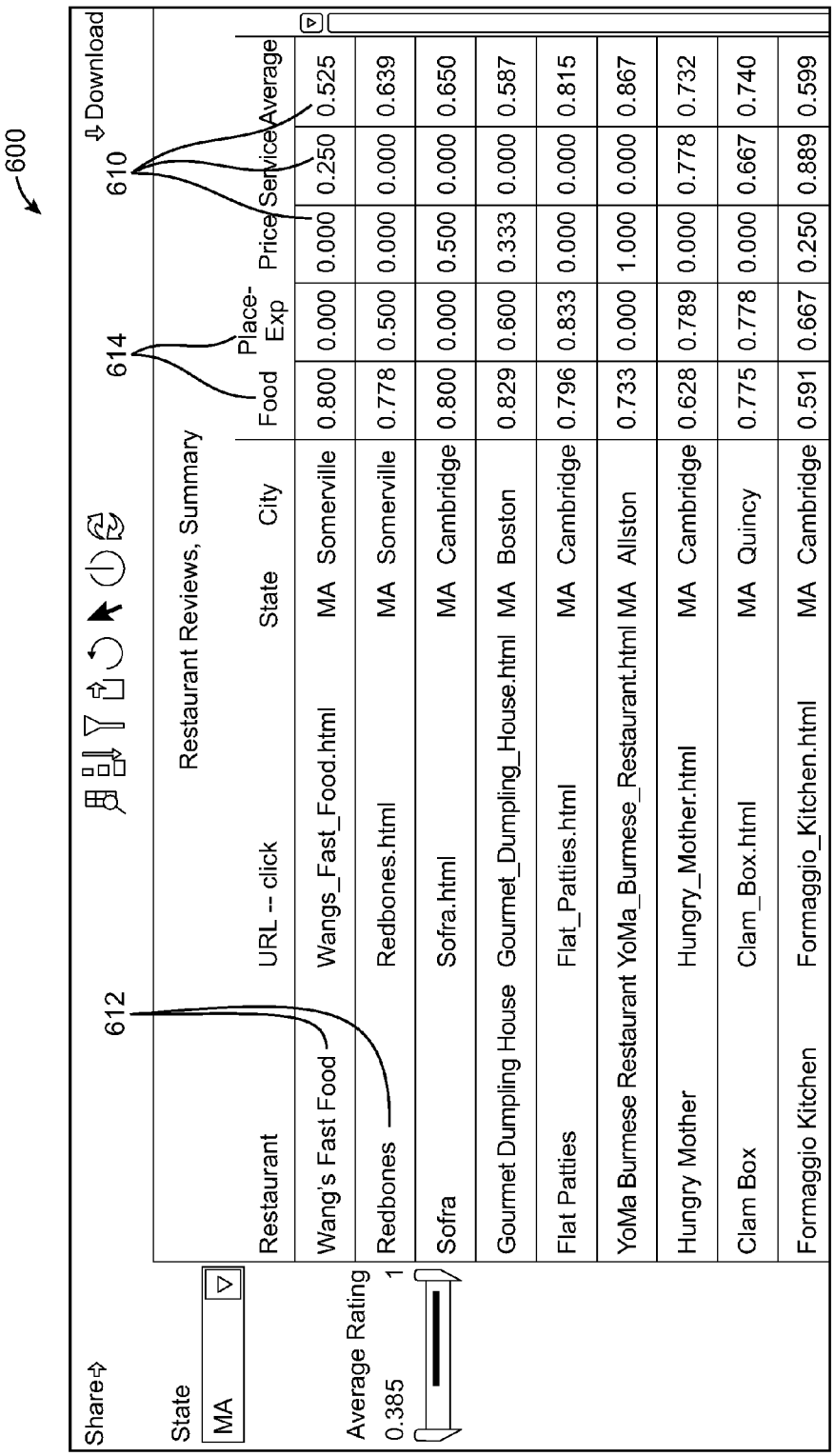
FIG. 6 illustrates a presentation generated to provide the terminations of sentiment value in context of individual subjects, according to one or more embodiments.

FIG. 6 illustrates a presentation generated to provide the terminations of sentiment value in context of individual subjects, according to one or more embodiments. An embodiment such as shown may be implemented on a domain for user reviews of business establishments, and more specifically, for restaurant reviews. Embodiments may alternatively be implemented on numerous other domains for subjects, such as wine reviews, food reviews, literary or movie reviews, and user commentary (e.g. in connection with news items or social network). In the example provided, individual business establishments are listed by name and information for a particular geographic region. A system such as described with FIG. 1 may be implemented to determine sentiment values associated with subjects as expressed in user generated text content. As mentioned with other examples, user generated text content may be determined from user reviews and commentary, blogs, social networking sites, or other forms of online media. Individual subjects (e.g. restaurant) may have a collection of, for example, user reviews. Each user generated text content (e.g. review) may be analyzed for sentiment, using for example sentiment scores associated with words or word pairings included in the article. As described with the methodology and embodiments above, the individual sentiment scoring for worse may be weighted, averaged or otherwise prioritized based on, for example, proximity of the sentiment caring terms to the subject of the content, as well as placement, frequency of sentiment terms and other metrics.

In some embodiments, the subject of the user generated text content is programmatically determined. The subject may correspond to, for example, a proper noun identifying a business establishment. The placement of the proper noun in the context of other terms such as those used in the domain or business establishment may identify the proper noun as the subject of the content.

In addition, categories for understanding the sentiments expressed towards the subject may be categorized using subject or domain specific categories. In the example of restaurant reviews, the subject or domain specific categories include food, experience, price, service, an overall sentiment value. As described with other embodiments, certain terms that are deemed to carry sentiment in the particular domain may be pre-associated with the particular category. For example, in the context of restaurant reviews, the term "slow" may be associated with the category of service (e.g. a low value or happiness score for that particular subcategory). Likewise, terms such as "delicious" may be associated with the category of food. As an addition or alternative, word pairings may be used to associate sentiment carrying terms to a particular predetermined category. Still further, word pairings may be used to identify both magnitude and category of the user sentiment.

With further reference to an embodiment of FIG. 6, a sentiment feature 610 may be generated in the form of a sentiment value. In some implementations, the sentiment value ranges between negative and positive sentiment. In the example provided, multiple sentiment values are determined for each subject 612, with each sentiment value being assigned to a particular category 614. In overall sentiment value may also be determined, either based on the sentiment values of the individual categories or based on an overall sentiment value as determined from corresponding individual text content items. The sentiment values 610 may be used to perform other presentation tasks, such as ranking or rating individual business establishments by sentiment value.

Computer System

FIG. 7 is a block diagram that illustrates a computer system upon which embodiments described herein may be implemented. For example, in the context of FIG. 1, system 100 may be implemented using a computer system such as described by FIG. 7.

In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 may also include a read only memory (ROM) 708 or other static storage device for storing static information and instructions for processor 704. A storage device 710, such as a magnetic disk or optical disk, is provided for storing information and instructions.

Computer system 700 can include display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments may include any number of input devices 714 coupled to computer system 700.

Embodiments described herein are related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for determining sentiment from user-generated text content, the method being performed by one or more processors and comprising:
   using the one or more processors to perform steps comprising:
   determining a subject of a user-generated text content including one or more terms;
   determining a sentiment value for the user-generated text content, wherein determining the sentiment value includes (a) determining a sentiment score for each of the one or more terms in the user-generated text content, and (b) weighing the sentiment score for each of the one or more terms based on a relationship between the term and the subject and a proximity of the term to the subject; and
   associating the sentiment value with the subject.

2. The method of claim 1, wherein the subject corresponds to a business establishment.

3. The method of claim 1, wherein the sentiment value is associated with a particular sentiment category.

4. The method of claim 1, wherein determining the sentiment value includes determining a category-specific sentiment value for each of multiple sentiment categories.

5. The method of claim 1, wherein the sentiment value is mapped to one or more of multiple types of sentiments.

6. The method of claim 5, wherein the multiple types of sentiments include two or more of disgust, sadness, anger, fear or happiness.

7. The method of claim 6, wherein the sentiment value is further mapped to an intensity of a corresponding type of sentiment in the multiple types of sentiments.

8. The method of claim 1, wherein the sentiment value correlates to a single sentiment.

9. The method of claim 1, wherein the sentiment score for each of the one or more terms is predetermined.

10. The method of claim 1, further comprising presenting content that is based on the user-generated text content, the content including a feature that is informative of the sentiment value that is determined for the user-generated text content.

11. The method of claim 1, wherein the user-generated text content corresponds to a user feedback of a business establishment or product, and wherein the sentiment value corresponds to a sentiment of a user's experience with the business establishment or product.

12. The method of claim 11, wherein the sentiment value indicates whether the user's experience with the business establishment or product was positive or negative.

13. The method of claim 11, wherein the sentiment value indicates an intensity of the sentiment of the user's experience with the business establishment or product.

14. The method of claim 11, wherein the business establishment or product corresponds to a restaurant or food item.

15. A system for determining sentiment from user-generated text content, the system comprising:
   one or more processors; and
   one or more memory resources storing instructions that, when executed by the one or more processors, cause the one or more processors to:
   analyze a user-generated text content, including determining (i) a subject of the user-generated text content, (ii) a sentiment score for individual terms that are present in the user-generated text content, and (iii) a sentiment value for the user-generated text content based at least in part on the determined sentiment score for the individual terms, wherein determining (iii) includes weighing the sentiment score for each of the individual terms based on a relationship between the term and the subject and a proximity of the term to the subject; and
   associate the sentiment value with the subject.

16. The system of claim 15, wherein the instructions, when executed by the one or more processors, further cause the one or more processors to store data that is based on the sentiment value in association with the determined subject.

17. The system of claim 15, wherein the instructions, when executed by the one or more processors, further cause the one or more processors to store the sentiment score for a list of terms.

18. The system of claim 15, wherein the instructions, when executed by the one or more processors, further cause the one or more processors to identify one or more terms that are salient to a domain of the subject for text content that is user-generated.

19. The system of claim 15, wherein the subject corresponds to a business establishment or product.

20. The system of claim 15, wherein the subject corresponds to a restaurant or food item.

21. The system of claim 15, wherein the sentiment score indicates an intensity for a user's like or dislike for the subject of the user-generated text content.

22. A method for determining sentiment from user-generated text content, the method being performed by one or more processors and comprising:
    using the one or more processors to perform steps comprising:
        determining a subject in a user-generated text content;
        determining one or more sentiment terms in the user-generated text content;
        determining a relevancy of each of the one or more sentiment terms to the subject;
        determining a sentiment score for each of the one or more sentiment terms; and
        determining a sentiment value for the subject based on one or more of the sentiment scores for each of the one or more sentiment terms that are determined to be relevant to the subject, wherein each of the sentiment scores are weighed based on a relationship between the sentiment term and the subject and a proximity of the sentiment term to the subject.

23. A non-transitory computer-readable medium that stores instructions for determining sentiment from user-generated text content, the instructions being executable by one or more processors for performing steps comprising:
    determining a subject of a user-generated text content;
    determining a sentiment value for the user-generated text content, wherein determining the sentiment value includes (a) determining a sentiment score for one or more terms in the user-generated text content, and (b) weighing the sentiment score for each of the one or more terms based on a relationship between the term and the subject and a proximity of the term to the subject; and
    associating the sentiment value with the subject.

* * * * *